Figure 1:
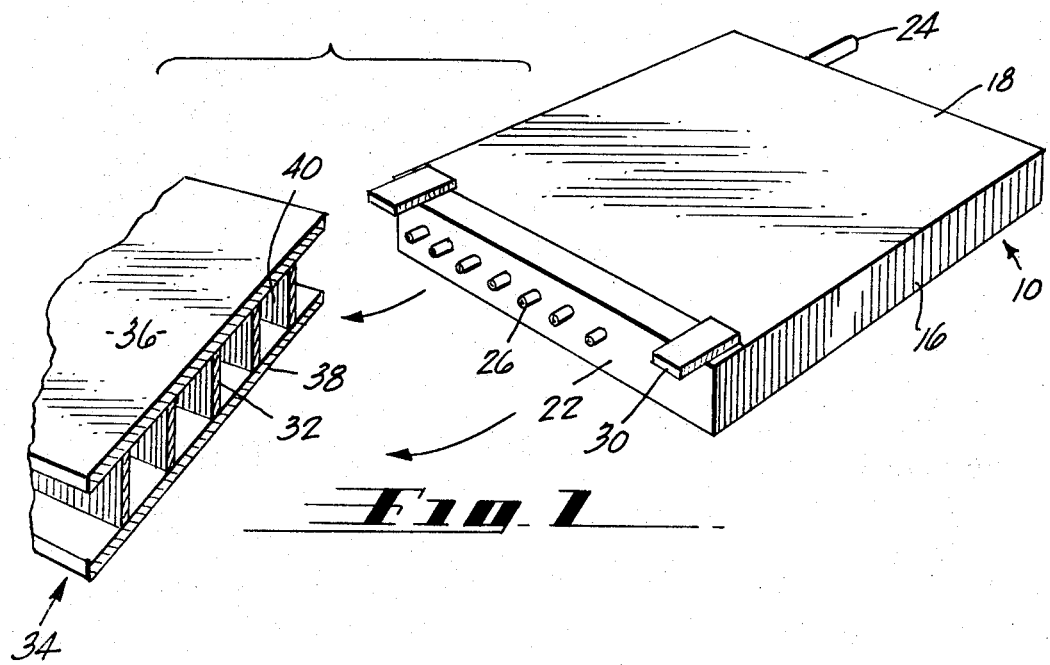

Oct. 10, 1967  R. T. PFAFFENBERGER ET AL  3,345,995
CHEMICAL METAL REMOVAL DEVICE
Filed Oct. 24, 1965

INVENTORS
LEONARD R. VAN HORN
RICHARD T. PFAFFENBERGER
BY Robert O. Richardson
ATTORNEY 3,345,995
CHEMICAL METAL REMOVAL DEVICE
Richard T. Pfaffenberger, Manhattan Beach, and Leonard R. Van Horik, Long Beach, Calif., assignors to Douglas Aircraft Company, Inc., Santa Monica, Calif.
Filed Oct. 24, 1965, Ser. No. 504,341
1 Claim. (Cl. 134—167)

The present invention relates to chemical metal removal devices and more particularly to such devices for the chemical removal of filler material imbedded within complex structural parts.

A method of producing ribbed metal sandwich structures was invented by Robert I. Jaffee for which a patent, Number 3,044,160, was issued on July 17, 1962. This patent describes the making of ribbed metal sandwich structures by placing ribs and filler bars between top and bottom face sheets within a pack, presenting a solid filled construction. The ribs and face sheets became welded together when subjected to suitable heat and pressure. In many configurations made in this manner the filler bars cannot be mechanically removed and they must be subjected to an acid bath to dissolve the filler material. Inasmuch as the face plates and ribs are of one kind of material and the filler bars are of another material, an appropriate acidic solution may be chosen that will dissolve the filler material but will not attack the face sheets and ribs.

The removal of filler material from between the ribs and face sheets is a time-consuming process. One of the basic problems is in the supplying of enough fresh solution to the surface of the filler material to be removed to keep the solution at the surface at full strength and to remove the gases of the reaction from the reacting surface.

The chemical metal removal device comprising the present invention is designed to supply a reactive solution to the surfaces to be removed. This solution is supplied in the form of a jet stream in order to wash away all reactive residue. The chemical metal removal device comprising the present invention utilizes fluid pressure and friction to maintain the tube end of the device in close proximity to the surface of the material to be chemically removed. The device consists of a closed manifold having an input for filling it under pressure with a chemical reactive solution. Along one edge of the manifold in abutting relationship with the ribbed metal sandwich structure are a plurality of openings through which tubes telescopically project. The internal pressure within the manifold urges these tubes inwardly between the ribs of the sandwich structure in close proximity to the metal being removed by the acid pumped therethrough. The force pushing the tubes down the flutes of the sandwich structure are obtained in two ways. One force is the differential pressure between the inlet and the exhaust of the manifold and the second force is the fluid friction forces within the tubes, which are greater than those on the outside, causing the tubes to be driven in the direction of the internal fluid flow.

It is therefore an object of this invention to provide for apparatus for chemically removing filler bars of a material which is reactive to the chemical agent used.

Another object is the provision of an apparatus for cehmically removing filler material between ribs of a metal sandwich structure.

Another object is the provision of a device for chemically removing filler material more quickly and less expensively than present methods.

Another object is the provision of a metal removal device which continually washes away all reactive residues from the surface of the metal under chemical attack.

Figure 2:
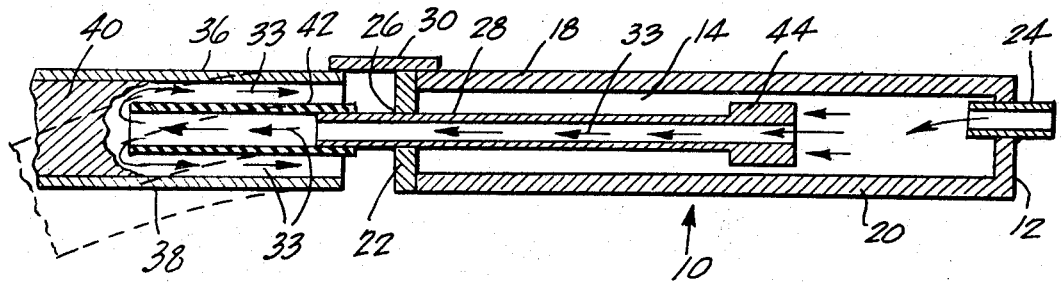

These and other objects will become more apparent as a description of the invention proceeds, having reference to the drawings wherein:

FIGURE 1 is a perspective view of the chemical metal removal device and a metal sandwich structure with which it is adapted to be used, and FIGURE 2 is a sectional view showing the device in operation.

Referring now to the drawings there is shown a manifold 10 which is a closed container consisting of a top 12, end walls 14, 16, side walls 18, 20 and a bottom face plate 22. A connection 24 is provided in the top 12 for obtaining a source of chemical solution. A plurality of openings 26 are provided in the face plate 22, each adapted to receive a fluid tube 28, telescopically movable therein. In the ideal situation there will be enough tubular members 28, and they will be positioned so as to fit between the ribs 32 of roll-weld package 34. This package includes face plates 36, 38 and ribs 32 of a material immune from attack by the chemical used. The filler bars 40 between the ribs 32 are of a material that is reactive to the chemical solution selected. Should there be too many telescoping members 28 or should they abut against the ribs 32 instead of between them, the ends thereof may be plugged in any appropriate manner. Tabs 30 abut against and rest upon face plate 36 for positioning purposes.

As shown in FIG. 2 tubes 28 have flexible extensions 42 thereon to permit negotiation around a corner if the configuration of the package 34 so requires it. It can be seen that as fluid is pumped into the manifold 10 through input opening 24, it exerts a uniform pressure throughout the inside of the manifold and urges the tube 28 out of the manifold through opening 26. This pressure urges the ends to abut the filler material 40 and to protrude inwardly between the ribs 32 as the filler material becomes removed. The chemical solution flow path, as shown by the arrows 33, shows the fluid additionally passing through the tubes 28 and flexible attachments 42 to the filler material 40 and then outwardly between the flexible connections 42 and the face plates 36 and 38. Flange 44 on the inner end of tube 28 limits the outermost direction of travel of the tube.

Tubes 28 push down to the surface of the filler material 40 being removed because of the differential pressure between the inlet and the exhaust of manifold 18 with inlet pressure being greater than the exhaust pressure of the fluid within the manifold. In addiiton, the fluid frictional forces are greater on the inside of tube 28 than on the outside of the tube and between the cover plates 36 and 38. This additionally causes the tube to be driven in the direction of the internal fluid flow.

While this metal removal device has been described as useful in the removal of filler material from sandwich structures having opposed face plates, it is to be understood that this will also work with ribs extending from one surface of and attached to a single face plate. This may be done by placing over the exposed ends of these ribs another sheet of material having a chemical resistance to the solution used. For example, when leaching out a carbon steel filler material with nitric acid, a sheet of titanium or stainless steel may be used.

While the foregoing description of a preferred embodiment has been made for purposes of illustrating the principles of this invention, it is to be understood that the invention is not limited thereto and that many modifications and variations will readily occur to those skilled in the art. It is to be understood that these deviations from the preferred embodiment just described are to be considered as part of the invention as defined by the following appended claim.

What is claimed is:

A chemical metal removal device for removing filler material embedded between ribs interconnecting spaced face sheets, wherein said filler material is of a metal other than that of said ribs and sheets, said device comprising:

a manifold for receiving chemical solutions, means supplying chemical solutions thereto under pressure, said solutions reacting upon said filler material but not upon said ribs and sheets, said manifold having a face plate adapted to abut against said ribs, filler material and face sheets, said face plate having openings in alignment with said filler material between said ribs, said openings having tubes telescopically mounted therein, said tubes being urged outwardly against said filler material by said solution.

References Cited

UNITED STATES PATENTS

| | | | |
|---|---|---|---|
| 1,954,222 | 4/1934 | Olson | 134—167 |
| 2,737,192 | 3/1956 | Bieler | 134—167 |
| 2,867,929 | 1/1959 | Monahan | 156—16 |
| 3,278,949 | 10/1966 | Whitaker | 134—168 X |

CHARLES A. WILLMUTH, *Primary Examiner.*

R. L. BLEUTGE, *Assistant Examiner.*